United States Patent
Kwak et al.

(10) Patent No.: US 9,860,864 B2
(45) Date of Patent: Jan. 2, 2018

(54) METHOD OF PERFORMING SYNCHRONIZATION IN DISTRIBUTED WIRELESS COMMUNICATION SYSTEM AND TERMINAL SUPPORTING THE SAME

(71) Applicant: Electronics and Telecommunications Research Institute, Daejeon (KR)

(72) Inventors: Byung-Jae Kwak, Daejeon (KR); Kapseok Chang, Daejeon (KR); June-Koo Rhee, Seongnam-si (KR); Junhyuk Kim, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 386 days.

(21) Appl. No.: 14/656,169

(22) Filed: Mar. 12, 2015

(65) Prior Publication Data

US 2015/0264658 A1    Sep. 17, 2015

(30) Foreign Application Priority Data

Mar. 12, 2014 (KR) .................. 10-2014-0028879
Jan. 8, 2015 (KR) .................. 10-2015-0002833
Jan. 12, 2015 (KR) .................. 10-2015-0004012
Feb. 13, 2015 (KR) .................. 10-2015-0022635

(51) Int. Cl.
*H04W 56/00* (2009.01)
*H04W 52/02* (2009.01)

(52) U.S. Cl.
CPC ... *H04W 56/0055* (2013.01); *H04W 52/0209* (2013.01); *Y02B 60/50* (2013.01)

(58) Field of Classification Search
CPC . H04W 56/001; H04W 56/002; H04W 88/02; H04W 88/04; H04W 88/06; H04B 7/26
See application file for complete search history.

(56) References Cited

U.S. PATENT DOCUMENTS

2014/0073372 A1    3/2014 Lee et al.
2014/0211781 A1    7/2014 Kim et al.

FOREIGN PATENT DOCUMENTS

KR    1020120048978 A    5/2012

OTHER PUBLICATIONS

Alexander,Tyrrell et al., Decentralized Slot Synchronization for Cellular Mobile Radio, NTT DoCoMo Technical Journal, Jun. 2008, pp. 60-67,vol. 10, No. 1.

(Continued)

*Primary Examiner* — Robert M Morlan
(74) *Attorney, Agent, or Firm* — William Park & Associates Ltd.

(57) ABSTRACT

Disclosed herein are a method of performing synchronization in a distributed wireless communication system, and a terminal supporting the same. A distributed wireless communication system includes a plurality of networks. Time resources of each of a plurality of networks are divided into a synchronization slot, a discovery slot, a peering slot, and a data slot. A first terminal belonging to a first network determines whether a synchronization signal is received from a terminal belonging to a second network in the data slot of the first network. The first terminal detects whether it has met the second network that is out of synchronization with the first network if the synchronization signal is determined to have been received.

20 Claims, 8 Drawing Sheets (56) References Cited

OTHER PUBLICATIONS

Jung-Hyun Kim et al., Distributed Frequency Synchronization for Global Synchronization in Wireless Mesh Networks, World Academy of Science and Technology, 2012, pp. 1080-1084, vol. 70 No. 10.

Nah-Oak Song et al., Enhancement of IEEE 802.11 Distributed Coordination Function with Exponential Increase Exponential Decrease Backoff Algorithm, Advanced Network Technologies Division, National Institute of Standards and Technology, Apr. 2003, pp. 2775-2778, vol. 4, Jeju, Korea.

Kapseok Chang et al., Collision Detection based PHY Proposal for PAC, Mar. 2014, IEEE 802.15-14-0132-00-0008IEEE 802.15-14-0132-00-0008, "Collision Detection based PHY Proposal for PAC," Mar. 2014.

Byung-Jae Kwak et al., Collision Detection Based Random Access Scheme for IEEE 802.15 TG8 PAC, Nov. 2013, IEEE 802.15-13-0650-00-0008.

Byung-Jae Kwak et al., Fully Distributed Contention Based MAC Proposal for PAC, Mar. 2014, IEEE 802.15-14-0131-01-0008.

Byung-Jae Kwak et al., Updated Proposal on Fully Distributed Synchronization Scheme for PAC, Jan. 2015, IEEE.802.15-15-0053-01-0008.

METHOD OF PERFORMING SYNCHRONIZATION IN DISTRIBUTED WIRELESS COMMUNICATION SYSTEM AND TERMINAL SUPPORTING THE SAME

CROSS-REFERENCE TO RELATED APPLICATION

This application claims priority to and the benefit of Korean Patent Application Nos. 10-2014-0028879, 10-2015-0002833, 10-2015-0004012, and 10-2015-0022635 filed in the Korean Intellectual Property Office on Mar. 12, 2014, Jan. 8, 2015, Jan. 12, 2015, and Feb. 13, 2015, the entire contents of which are incorporated herein by reference.

BACKGROUND OF THE INVENTION (a) Field of the Invention

The present invention relates to a method of performing synchronization in a distributed wireless communication system and a terminal supporting the same.

(b) Description of the Related Art

Most wireless communication systems use a synchronization method because there are many advantages if terminals are synchronized with each other in a wireless communication system. In a synchronization method, a time domain is divided into repetition intervals that are periodically repeated. Each of the repetition intervals is divided into slots, that is, smaller intervals, and some operations of a terminal are performed in respective specific slots. One of the advantages of the synchronization method is to efficiently support sleep mode for reducing power consumption. That is, if terminals within a network are aware of the structures of repetition intervals and slots, they operate in transmission or reception mode only in some slots within an interval or slots, but maintain an inactive state, thereby being capable of reducing power consumption.

There are some methods in which terminals belonging to the same network are synchronized with each other or maintain synchronization. As in a cellular system, there is a central control type of synchronization method, which is a method in which a specific system or terminal provides a signal, that is, a basis for synchronization (hereinafter a "synchronization signal"), and the remaining terminals are synchronized using the provided synchronization signal. Furthermore, there is a distribution type of synchronization method in which a specific system or terminal does not send a synchronization signal, but terminals within a network themselves participate in the transmission of a synchronization signal.

The distribution type of synchronization method includes a physical layer distribution type of synchronization method. In the physical layer distribution type of synchronization method, when terminals within a network send or receive a specially designed synchronization signal, they are synchronized using the time when the synchronization signal is received. The synchronization signal used in the physical layer distribution type synchronization method includes a pulse signal, a chirp signal, and a modulated Zadoff-Chu (ZC) signal. The physical layer distribution type synchronization method is advantageous in that the time when each of synchronization signals is received can be estimated if two overlapping synchronization signals have orthogonal characteristics although the two synchronization signals are overlapped and received. If a radio channel for a synchronization signal is used by another device, however, inter-signal interference may occur when the synchronization signal is transmitted. Accordingly, the physical layer distribution type synchronization method is disadvantageous in that it effectively operates only when a radio channel for a synchronization signal is always secured.

The distribution type of synchronization method further includes a method of sending additional information related to synchronization when a synchronization signal is transmitted. For example, time offset information may also be transmitted in a synchronization signal. A terminal that has received the synchronization signal performs network synchronization using the time when the synchronization signal is received and a time offset value. Such a method is useful if a radio channel is shared with another communication system in a non-license band or if a collision with a synchronization signal transmitted by another terminal is to be avoided (i.e., if it is impossible to always send a synchronization signal at a desired time). For example, this method is useful when a synchronization signal is transmitted using a contention-based media access control method, such as carrier sensing multiple access with collision avoidance (CSMA/CA).

If networks operating according to the distribution type of synchronization method are spatially separated from one another, they may meet if a radio channel between the networks is changed. In this case, what two networks "meet" means the state in which some or all of terminals belongs to one network are capable of receiving the transmission signals of some or all of terminals that belong to the other network. For example, a case where spatially separated networks meet may occur if the networks move and thus the distance between terminals belonging to the networks becomes close or if an object that hinders communication between two networks disappears.

If two networks that are spatially separated meet, they can be out of synchronization. That is, when two networks are out synchronization, the repetition intervals are out of synchronization. If two networks that are not synchronized meet as described above, they may generate mutual interference, leading to a problem in network operations.

SUMMARY OF THE INVENTION

The present invention has been made in an effort to provide a method of performing synchronization in a distributed wireless communication system and a terminal supporting the same, which have an advantage of performing synchronization between at least two networks that are not synchronized if the at least two networks meet.

An exemplary embodiment of the present invention provides a method of performing, by a first terminal belonging to a first network, synchronization in a distributed wireless communication system. The synchronization method may include dividing a first interval that is a time resource of each of a plurality of networks belonging to the distributed wireless communication system, into a synchronization slot and a data slot, determining whether a synchronization signal is received from a terminal belonging to a second network different from the first network in the data slot of the first network, and detecting whether the first terminal has met the second network that is out of synchronization with the first network if the synchronization signal is determined to have been received.

The first interval may further include a discovery slot and a peering slot, the synchronization method may further include operating in a reception mode without sending data during a second interval corresponding to the synchronization slot, discovery slot, and peering slot of the first network, if the synchronization signal is determined to have been received.

The first interval may further include a discovery slot and a peering slot, the synchronization method may further include stopping operating in the discovery slot or peering slot of the first network if the synchronization signal is determined to have been received.

The synchronization method may further include sending data in the remaining intervals other than the second interval in the data slot of the first network.

The synchronization method may further include notifying remaining terminals that belong to terminals belonging to the first network and that do not include the first terminal of the meeting with the second network.

The first interval may further include a discovery slot and a peering slot, botifying the remaining terminals may include sending a message providing notification of the meeting of the second network in the discovery slot or peering slot of the first network.

The first interval may further include a discovery slot and a peering slot, notifying the remaining terminals may include including information providing notification of the meeting of the second network in a synchronization signal transmitted by the first terminal and sending the synchronization signal.

The synchronization method may further include determining whether or not to move to the second network, and being synchronized with the second network if the first terminal determines to move to the second network.

The synchronization method may further include notifying terminals belonging to the first network of the move if the first terminal moves to the second network.

The first interval may further include a discovery slot and a peering slot, notifying the terminals of the move may include sending information providing notification of the move to the terminals belonging to the first network in a message form in the discovery slot or peering slot of the first network.

The synchronization method may further include notifying the terminals belonging to the second network of the move if the first terminal moves to the second network.

The first interval may further include a discovery slot and a peering slot, notifying the terminals of the move may include sending information providing notification of the move to the terminals belonging to the second network in a message form in the discovery slot or peering slot of the second network.

The first interval may further include a discovery slot and a peering slot, the synchronization method may further include not sending data while operating in reception mode during a second interval corresponding to the synchronization slot, discovery slot, and peering slot of the first network, if the first terminal has completed the synchronization and moved to the second network.

The synchronization method may further include sending the data in intervals other than the second interval in the data slot of the second network.

Determining whether or not to move to the second network may include determining whether or not to move to the second network based on a second interval indicative of a time difference between the synchronization slot of the first network and the synchronization slot of the second network, and a third interval obtained by subtracting the second interval from the first interval.

Determining whether or not to move to the second network may include determining to move to the second network if the third interval is smaller than the second interval.

Being synchronized with the second network may include being synchronized with the second network after a time-out if the first terminal determines to move to the second network, and the time-out may be determined based on the size of a contention window of the first terminal.

Another exemplary embodiment of the present invention provides a terminal belonging to a first network of a plurality of networks included in a distributed wireless communication system. The terminal may include an RF module configured to receive a synchronization signal from a second network of the plurality of networks and a processor configured to determine whether the synchronization signal is received in a data slot that is an interval that belongs to time resources of the first network and in which data is transmitted or received and to detect that the terminal has met the second network that is out of synchronization with the first network if the synchronization signal is determined to be received in the data slot.

The processor may operate in a reception mode without sending data in the synchronization slot, discovery slot, and peering slot of the first network if the synchronization signal is determined to be received in the data slot.

The processor may control the terminal so that the terminal moves to the second network after a time-out if the synchronization signal is determined to be received in the data slot, and the specific interval may be determined based on the size of the contention window of the terminal.

In accordance with an exemplary embodiment of the present invention, if networks out of synchronization meet, they can be synchronized while maintaining normal operations of the networks.

DETAILED DESCRIPTION OF THE EMBODIMENTS

In the following detailed description, only certain exemplary embodiments of the present invention have been illustrated and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may refer to a mobile station (MS), a mobile terminal (MT), an advanced mobile station (AMS), a high reliability mobile station (HR-MS), a subscriber station (SS), a portable subscriber station (PSS), an access terminal (AT), or user equipment (UE), and may include some or all of the functions of the MT, MS, AMS, HR-MS, SS, PSS, AT, and UE.

A base station (BS) may refer to an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) functioning as a base station, a relay node (RN) functioning as a base station, an advanced relay station (ARS) functioning as a base station, a high reliability relay station (HR-RS) functioning as a base station, or a small base station [e.g., a femto BS, a home node B (HNB), a home eNodeB (HeNB), a pico BS, a metro BS, or a micro BS], and may include some or all of the functions of the ABS, nodeB, eNodeB, AP, RAS, BTS, MMR-BS, RS, RN, ARS, HR-RS, and small base station.

Furthermore, a network means a set of terminals that are placed at adjacent locations and capable of exchanging of data or control information. In this case, the control information or data exchanged between the terminals includes control information or data exchanged through another terminal within a network (i.e., multi-hop relay) in addition to control information or data exchanged between two terminals.

A method of performing synchronization in a distributed wireless communication system and a terminal supporting the same in accordance with exemplary embodiments of the present invention are described in detail below. A distributed wireless communication system environment is described as an example. A distributed wireless communication system is known to a person having ordinary skill in the art to which an exemplary embodiment of the present invention pertains, and a detailed description thereof is omitted.

Figure 1:
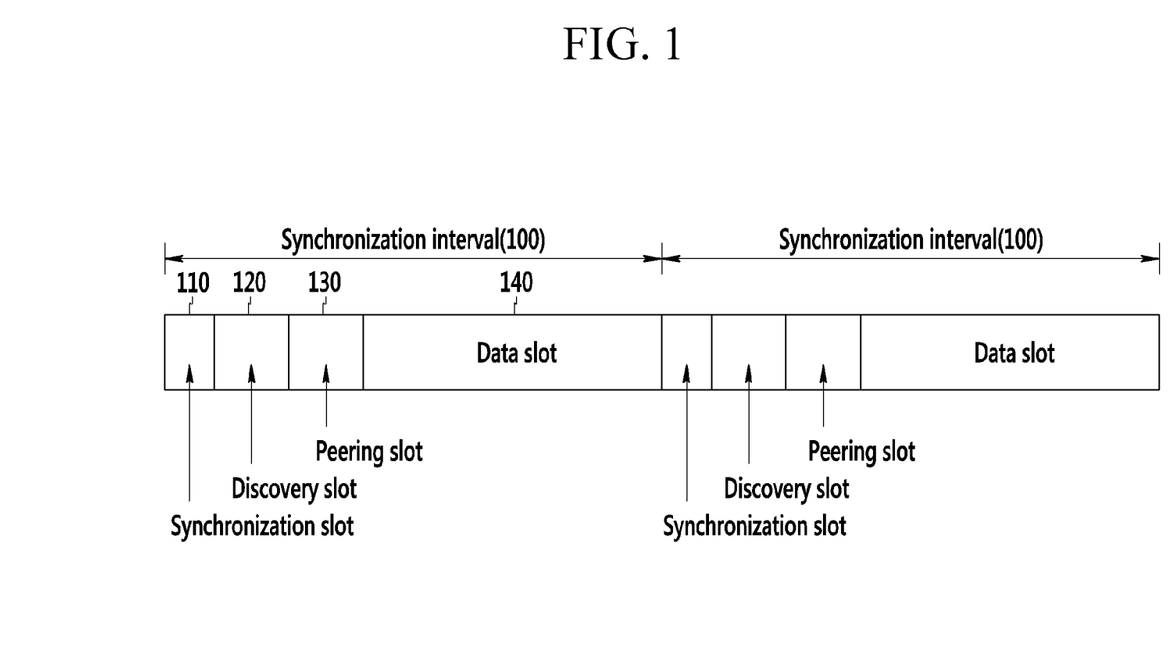
FIG. 1 is a diagram illustrating a repetition interval in a distributed wireless communication system in accordance with an exemplary embodiment of the present invention.

FIG. 1 is a diagram illustrating a repetition interval in the distributed wireless communication system in accordance with an exemplary embodiment of the present invention. The repetition interval corresponds to time resources in the distributed wireless communication system.

In FIG. 1, a synchronization interval 100 corresponds to a repetition interval in a time domain. The repetition interval (i.e., the synchronization interval 100) may correspond to a frame, a super frame, or a beacon interval depending on communication systems. The repetition interval is illustrated as being the synchronization interval 100 for convenience of description, but another term may be used instead of the synchronization interval 100.

As illustrated in FIG. 1, each of synchronization intervals includes a synchronization slot 110, a discovery slot 120, a peering slot 130, and a data slot 140. A term "period" may be used instead of the term "slot." In this case, the slots may be respectively used as a "synchronization period", a "discovery period", a "peering period", and a "data period".

The synchronization slot 110 refers to a time interval in which terminals within a network send or receive a synchronization signal in order to perform synchronization. The discovery slot 120 refers to a time interval in which a terminal sends or receives a discovery message in order to search for another terminal or another service. The peering slot 130 refers to a time interval in which terminals send or receive messages in order to set up a link between the terminals. Furthermore, the data slot 140 refers to a time interval in which terminals send or receive data.

Resources need to be allocated in order for a terminal to send data in the data slot 140. A contention-based or non-contention-based method may be used as a method of allocating resources. If the contention-based method is used, the data slot 140 may be used as a contention access period. If the non-contention-based method is used, the data slot 140 may be used as a contention-free period.

Figure 2:
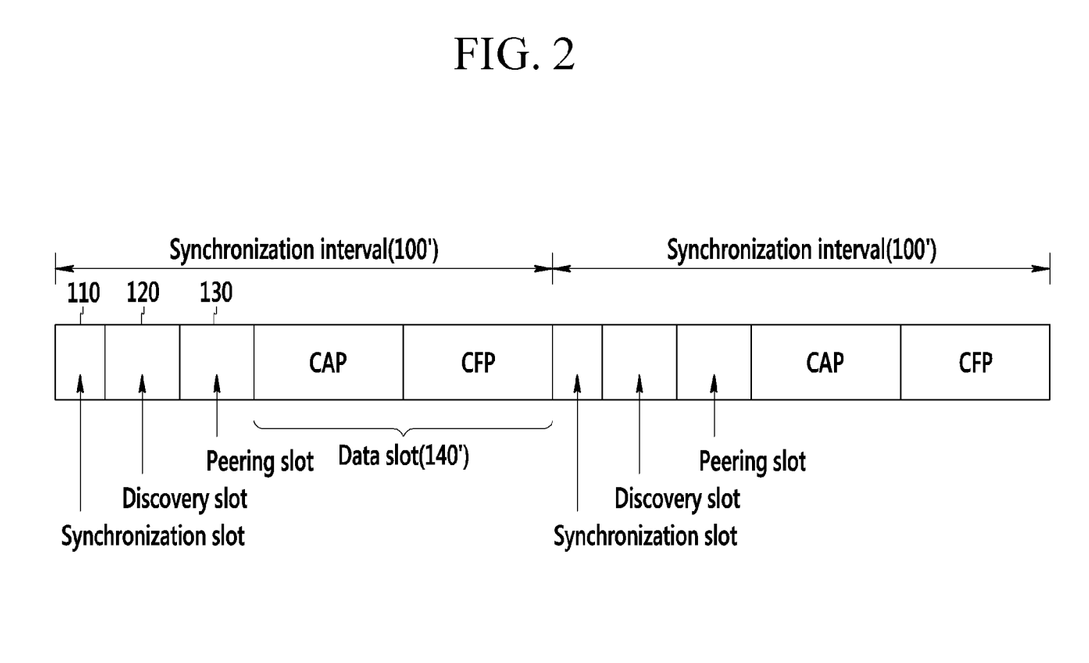
FIG. 2 is a diagram illustrating a synchronization interval in accordance with another exemplary embodiment of the present invention.

FIG. 2 is a diagram illustrating the synchronization interval 100' in accordance with another exemplary embodiment of the present invention.

The synchronization interval 100' of FIG. 2 is the same as synchronization interval 100 of FIG. 1 except that a data slot 140' is divided into a CAP and a CFP. That is, in the CAP, resources for data transmission may be allocated according to the contention-based method. In the CFP, resources for data transmission may be allocated according to the non-contention-based method.

A terminal may maintain an inactive state in a specific slot in order to reduce power consumption. For example, a terminal may maintain an active state in the synchronization slot 110, the discovery slot 120, and the peering slot 130 and maintain an inactive state in the data slots 140 and 140', thereby being capable of reducing power consumption. As another example, a terminal may maintain an active state only in the synchronization slot 110 and maintain an inactive state in the remaining slots in order to reduce power consumption.

FIGS. 3 to 6 are diagrams illustrating examples of relative position in time between synchronization intervals when two networks having different synchronizations meet each other. That is, FIGS. 3 to 6 illustrate examples of synchronization intervals for two networks N1 and N2 that are not synchronized with each other and that use a distribution type of synchronization method.

Figure 3:
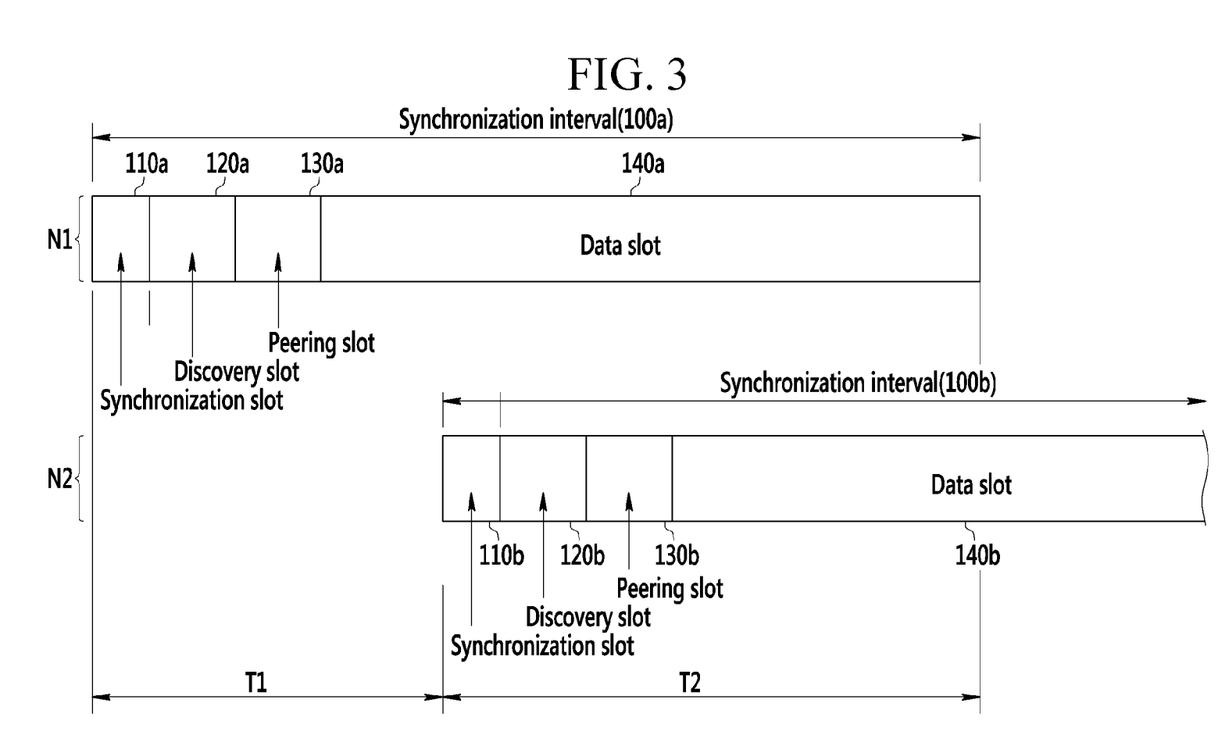
FIGS. 3 to 6 are diagrams illustrating examples of a relative position in time between synchronization intervals when two networks having different synchronizations meet each other.
Figure 4:
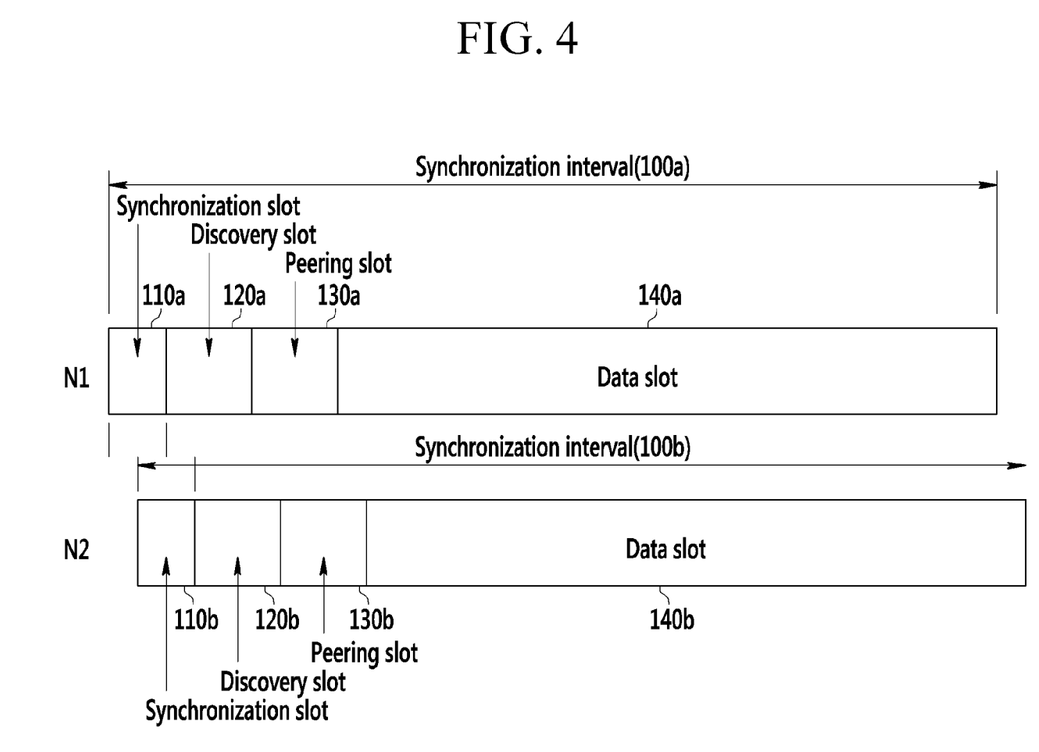
Figure 5:
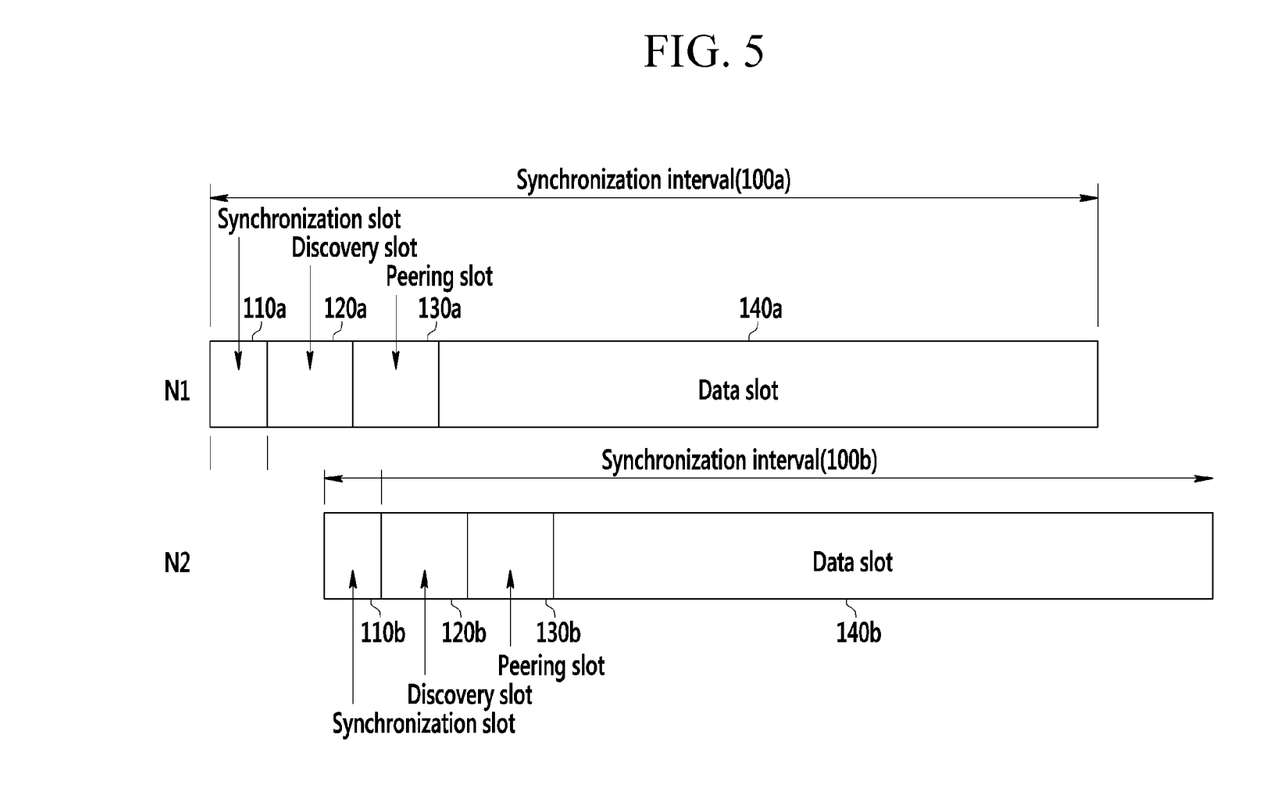
Figure 6:
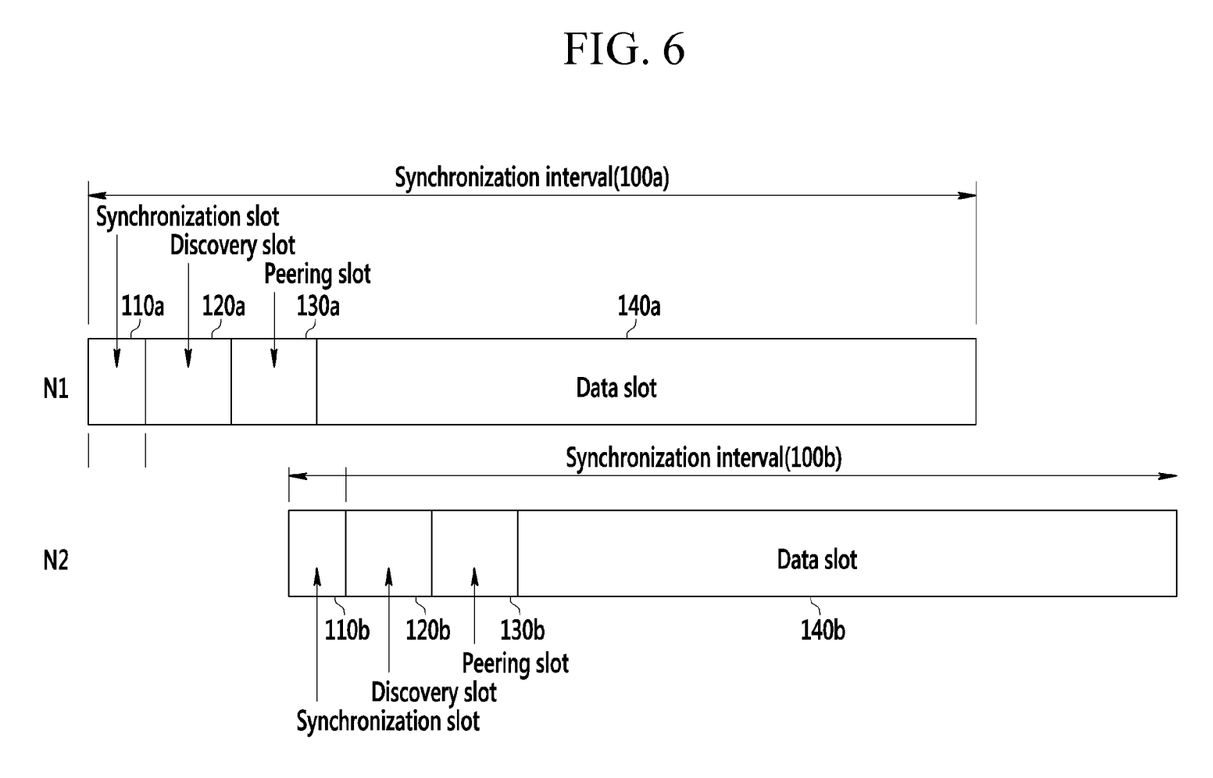

FIG. 3 illustrates an example in which a synchronization slot 110b, a discovery slot 120b, and a peering slot 130b corresponding to the second network N2 overlap with the data slot 140a of the first network N1. FIG. 4 illustrates an example in which a synchronization slot 110a of the first network N1 overlaps with the synchronization slot 110b of the second network N2. Furthermore, FIG. 5 illustrates an example in which a discovery slot 120a of the first network N1 overlaps with the synchronization slot 110b of the second network N2, and FIG. 6 illustrates an example in which a peering slot 130a of the first network N1 and the synchronization slot 110b of the second network N2.

A method of performing synchronization by terminals belonging to two networks that are out of synchronization as in FIGS. 3 to 6 with respect to the two networks is described with reference to FIG. 7. It is assumed that the two networks N1 and N2 are internally synchronized. In the following description, the example of FIG. 3 is described for convenience of description. A synchronization establishment method to be described below may be identically applied to the examples of FIGS. 4 to 6.

Figure 7:
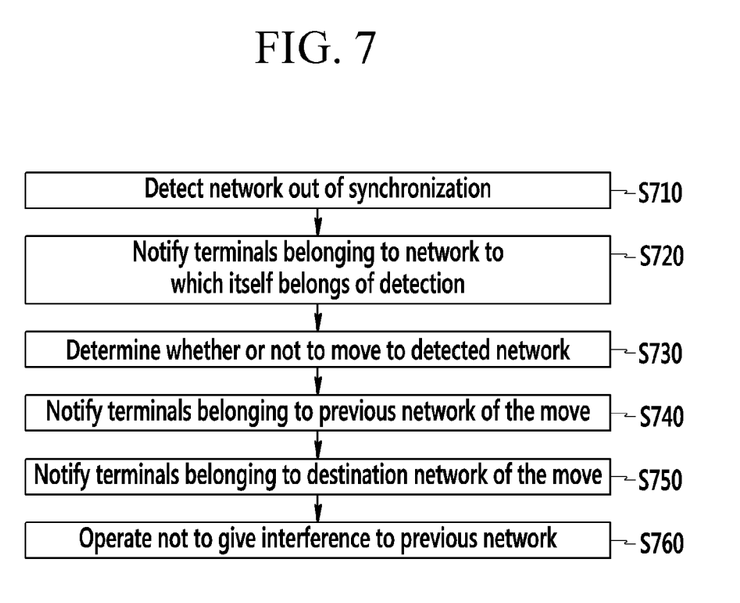
FIG. 7 is a flowchart illustrating a method of performing synchronization in a distributed wireless communication system in accordance with an exemplary embodiment of the present invention.

FIG. 7 is a flowchart illustrating a method of performing synchronization in a distributed wireless communication system in accordance with an exemplary embodiment of the present invention.

First, terminals belonging to the first network N1 may maintain synchronization by sending or receiving synchronization signals in the synchronization slot 110a of the first network N1. The terminals belonging to the first network N1 may send or receive discovery messages in the discovery slot 120*a* of the first network N1. Furthermore, the terminals belonging to the first network N1 may send or receive messages for setting up links between the terminals in the peering slot 130*a* of the first network N1.

The terminals belonging to the first network N1 may send or receive data in the data slot 140*a* of the first network. If a synchronization signal transmitted by a terminal belonging to another network is received in the data slot 140*a* of the first network N1, the terminals belonging to the first network N1 detect that they have met another network that is out of synchronization with the first network N1 to which the terminals belong at step S710. That is, if a terminal belonging to the first network N1 receives a synchronization signal transmitted by a terminal belonging to the second network N2, the terminal detects that it has met the second network N2.

Terminals belonging to the second network N2 may maintain synchronization by sending or receiving synchronization signals in the synchronization slot 110*b* of the second network N2. The terminals belonging to the second network N2 may send or receive discovery messages in the discovery slot 120*b* of the second network N2. Furthermore, the terminals belonging to the second network N2 may send or receive messages for setting up links between the terminals in the peering slot 130*b* of the second network N2.

The terminals belonging to the second network N2 may send or receive data in a data slot 140*b* of the second network N2. If a synchronization signal transmitted by a terminal belonging to another network is received in the data slot 140*b* of the second network N2, the terminals belonging to the second network N2 detect that they have met another network that is out of synchronization with the second network N2 to which the terminals belong at step S710. That is, if a synchronization signal transmitted by a terminal belonging to the first network N1 is received, a terminal belonging to the second network N2 detects that it has met the first network N1.

Thereafter, the terminals that have detected another network that is out of synchronization with a network to which they belong may notify other terminals belonging to their network of the detection at step S720. In this case, the terminals may send a message that provides notification of the detection in the discovery slot or peering slot of the network to which the terminals belong in a message form. Furthermore, the terminals may include the message providing notification of the detection in a synchronization signal transmitted by them and send the synchronization signal.

The terminals that have detected another network that is out of synchronization with a network to which the terminals belong may temporarily remain intact without a change of their operations in the synchronization slot of the network to which they belong. Furthermore, the terminals that have detected another network that is out of synchronization with the network to which they belong may temporarily stop their operations in the discovery slot or peering slot of the network to which they belong and operate in reception mode until the detected network and their own network are synchronized with each other. The terminals that have detected another network that is out of synchronization with a network to which they belong may not send data in a time interval corresponding to the synchronization slot, discovery slot, and peering slot of the detected network and may operate in reception mode in order to not hinder the operation of the detected network. In this case, the terminals may send data while maintaining a normal operation in other intervals that belong to the data slot of the network to which they belong and that do not correspond to the synchronization slot, discovery slot, and peering slot of the detected network.

Thereafter, the terminals that have detected another network that is out of synchronization with a network to which they belong may remain intact in the network to which they belong or move to the detected network at step S730. A method of determining whether or not to remain intact in the network to which the terminal belongs or to move to the detected network is described in detail later.

What "a terminal moves to a detected network" may mean is that the terminal stops its operation in the synchronization slot of a network to which the terminal belongs and starts a synchronization operation again in the synchronization slot of the detected network. In this case, a point of time at which the terminal stops its operation in the synchronization slot of the network to which the terminal belongs may be earlier or later than a point of time at which the terminal starts a synchronization operation again in the synchronization slot of the detected network. Hereinafter, a network to which a terminal has moved is called a "destination network" and a network prior to the move of the terminal is called a "previous network."

Thereafter, the terminal that moves to the destination network may notify terminals belonging to the previous network of such a move at step S740. In a method of providing notification of the move, the terminal may send information about the move in the discovery slot or peering slot of the previous network in a message form, and may include information that provides notification of the move in a synchronization signal in the synchronization slot of the previous network and send the synchronization signal.

Thereafter, the terminal that moves to the destination network may notify terminals belonging to the destination network of its move at step S750. In this case, the terminal may provide notification of the move in the discovery slot or peering slot of the destination network in a message form, and may include information that provides notification of the move in a synchronization signal in the synchronization slot of the destination network and send the synchronization signal.

In order to avoid interference with the previous network, the terminal that moves to the destination network may not send data while operating in reception mode in a time interval corresponding to the synchronization slot, discovery slot, and peering slot of the previous network after the move to the destination network is completed at step S760. However, the terminal may send data while performing a normal operation in the remaining intervals (i.e., intervals other than the synchronization slot, discovery slot, and peering slot of the previous network) of the data slot of the destination network.

In FIG. 3, terminals that belong to the first network N1 or second network N2 and that are in sleep mode are inactive in the data slot of a network to which they belong. Accordingly, the terminals in the inactive state are unable to directly detect another network that is out of synchronization with the network to which they belong. However, as described at step S720, terminals that have detected another network that is out of synchronization with a network to which they belong may send a message that provides notification of the detection in the discovery slot or peering slot or may include the message in a synchronization signal and send the synchronization signal. Accordingly, the terminals in sleep mode are able to indirectly detect another network that is out of synchronization with the network to which they belong. As described at step S740, terminals that move to a destination network may send a message providing notification of a move in the discovery slot or peering slot of a previous network, and may include the message in a synchronization signal and send the synchronization signal. Accordingly, the terminals in sleep mode are able to indirectly detect another network that is out of synchronization with the network to which they belong. In this case, the terminals in sleep mode may awake from sleep mode and comply with the procedures described at steps of FIG. 7.

A criterion for determining whether the terminal will remain intact in the network to which the terminal belongs or will move to the detected network at step S720 is as follows.

In FIG. 3, if a time T1 is smaller than a time T2, terminals belonging to the second network N2 may move to the first network N1. In this case, the terminals belonging to the second network N2 may detect the first network N1 that is out of synchronization with the second network N2 and immediately move to the first network N1 or wait for a time-out and move to the first network N1. T1 is indicative of a time difference between a point of time at which the synchronization slot of the first network N1 is started and a point of time at which the synchronization slot of the second network N2 is started. T2 is a time obtained by subtracting the time T1 from the entire synchronization interval.

If the time T1 is greater than the time T2, the terminals belonging to the second network N2 move to the first network N1.

The reason why terminals do not immediately move to a detected network but wait for time-out and move to the detected network is to check whether the synchronization signal of the detected network is consistently transmitted. That is, the terminals may give up the move if the detected network is no longer detected for time-out. Furthermore, if the synchronization signal of the detected network is not consistently received for time-out, the terminals may determine that they do not trust the detected network and give up the move to the detected network. In this case, the time-out may be determined using the state variable of a terminal. For example, if a contention-based media access control method using a contention window (CW), such as CSMA/CA, is used, the time-out may be determined using the current size of the CW of a terminal and a current backoff counter value of the terminal.

If a terminal determines time-out using the size of a CW, etc. and the time-out has elapsed, the time-out may be changed. In this case, if there is a terminal that moves from a network to which the terminal belongs to another network or there is a terminal that moves from another network to the network to which the terminal belongs, the terminal may reduce the value of the time-out or change the value of the time-out to a greater value using such information. If a contention-based media access control method using a CW, such as CSMA/CA, is used, the value of the CW is increased if the number of terminals within a network is increased, and the value of the CW is reduced if the number of terminals within a network is reduced. Accordingly, a smaller number of terminals either the terminals of the first network N1 or the terminals of the second network N2 may move to the other network. Furthermore, if there is a terminal moving from the first network N1 to the second network N2, the terminals of the first network N1 may reduce their time-out and the terminals of the second network N2 may increase their time-out in order to facilitate the move from the first network N1 to the second network N2 and to reduce the move from the second network N2 to the first network N1. In this case, time-out may be changed whenever a terminal moves, or the time-out may be changed according to a monitoring result after a situation is monitored for a predetermined interval. The move of a terminal to a network may be notified through a message that is sent by terminals in order to provide notification of the move in a discovery slot or peering slot, or move notification information that is included in a synchronization signal and transmitted.

A subsequent operation of a terminal that has moved to another network as described with reference to FIG. 7 is described below.

If a contention-based media access control method using a CW, such as CSMA/CA, is used, a current value of the CW of a terminal is a value into which the situation of a previous network has been incorporated and into which the situation of a destination network has not been incorporated. Accordingly, if the terminal uses an existing CW value without any change, it may have a bad influence on the operation of the destination network. Furthermore, if many terminals move to a specific network within a short time, a packet collision probability may be increased until the specific network becomes a steady state. In order to minimize such a problem, a terminal that has moved to another network may change its CW value along with its move. For example, a terminal that has moved to another network may increase or decrease the value of a CW prior to a move using a specific function.

There may be a case where a terminal moves to another network due to an erroneous decision. In this case, there is a need for a method of allowing the terminal that has moved to another network to move to the original network again. To this end, the terminal that has moved to another network repeats the aforementioned network move procedure. A function used to determine a time-out value may not be the same function as that described above.

After a terminal moves to another network, the terminal monitors the synchronization situation of the other network for time-out. The terminal determines whether a process of merging two networks having different synchronizations into a single network has been completed by monitoring a synchronization situation. In this case, the terminal returns to a normal operation if the two networks are determined to have been merged into a single network. For example, a terminal may determine that two networks have been merged into a single network if synchronization signals having different reference points are no longer received and received synchronization signals have the same reference time.

In the above description, the example of FIG. 3 has been assumed and described for convenience of description, but the aforementioned synchronization establishment method may be applied to the examples of FIGS. 4 to 6. In the case of the example of FIG. 4, however, interference attributable to synchronization signals may occur because the synchronization slots overlap with each other. Accordingly, in the case of the example of FIG. 4, two networks need to be synchronized with each other more rapidly. In this case, after detecting another network, a terminal moving to another network may immediately move to the other network without waiting for a time-out or set a time-out to be shorter.

A method of detecting, by the terminal, another network that is out of synchronization with the network to which the terminal belongs described at step S710 is described in more detail below.

If a terminal receives a synchronization signal at a different location other than in the synchronization slot of a network to which the terminal belongs, the terminal may not immediately determine that it has detected a network with which the synchronization signal is not synchronized. That is, if a synchronization signal having a different reference time is consistently received for time-out, a terminal may determine that it has detected another network that is out of synchronization with a network to which the terminal belongs. The term "consistently" may mean that another synchronization signal continues to be received and the reference time indicated by the received synchronization signal remains unchanged within an error range. Furthermore, the terms "consistently received" means that a synchronization signal is consistently received at a location corresponding to the synchronization slot of another network and does not mean that a synchronization signal is always received every synchronization slot. For example, if synchronization signals having different reference times have been received in two of three consecutive synchronization intervals and the two received synchronization signals are indicative of the same reference time, a terminal may determine that it has detected another network.

If a terminal has received a synchronization signal in the synchronization slot of a network to which the terminal belongs, but the reference time of the received synchronization signal exceeds the error range of the reference time of the network to which the terminal belongs, the terminal may determine that a synchronization signal having a different reference time has been received.

If a terminal detects two or more different networks that are out of synchronization with a network to which the terminal belongs, the terminal may be synchronized with a network that is first detected and then be synchronized with the remaining network. For example, if a terminal detects N different networks that are out of synchronization with a network to which the terminal belongs, the terminal may be sequentially synchronized with the N detected networks. In this case, if there are networks that are simultaneously detected, an order that the networks are synchronized may be randomly determined. In another method, a terminal may estimate the sizes of detected networks and determine an order that the networks are synchronized based on the estimated sizes. For example, a terminal may be first synchronized with a network having a large size and then synchronized with a network having a small size. For another example, a terminal may be first synchronized with a network having a small size and then synchronized with a network having a large size. The size of a network may correspond to the number of terminals within the network. The size of a network may be estimated using the size of a contention window included in a received synchronization signal.

Figure 8:
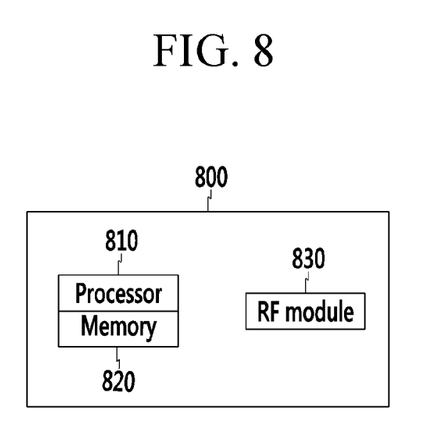
FIG. 8 is a diagram illustrating a terminal in accordance with an exemplary embodiment of the present invention.

FIG. 8 is a diagram illustrating a terminal in accordance with an exemplary embodiment of the present invention.

As illustrated in FIG. 8, a terminal 800 in accordance with an exemplary embodiment of the present invention includes a processor 810, a memory 820, and an RF module 830.

The processor 810 may be configured to implement the procedures, methods, and functions described with reference to FIGS. 1 to 7.

The memory 820 is connected to the processor 810, and stores a variety of types of information related to the operation of the processor 810.

The RF module is connected to an antenna (not illustrated), and sends or receives radio signals. Furthermore, the antenna may be implemented using a single antenna or a multiple antenna (i.e., MIMO antenna).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of performing, by a first terminal belonging to a first network, synchronization in a distributed wireless communication system, the method comprising:
    dividing a first interval that is a time resource of each of a plurality of networks belonging to the distributed wireless communication system into a synchronization slot and a data slot;
    determining whether a synchronization signal is received from a terminal belonging to a second network different from the first network in the data slot of the first network; and
    detecting whether the first terminal has met the second network that is out of synchronization with the first network if the synchronization signal is determined to have been received.

2. The synchronization method of claim 1,
    wherein the first interval further comprises a discovery slot and a peering slot,
    the method further comprises operating in a reception mode without sending data during a second interval corresponding to the synchronization slot, discovery slot, and peering slot of the first network, if the synchronization signal is determined to have been received.

3. The synchronization method of claim 1,
    wherein the first interval further comprises a discovery slot and a peering slot,
    the method further comprises stopping operating in the discovery slot or peering slot of the first network if the synchronization signal is determined to have been received.

4. The synchronization method of claim 2, further comprising sending data in remaining intervals other than the second interval in the data slot of the first network.

5. The synchronization method of claim 1, further comprising notifying remaining terminals that belong to terminals belonging to the first network and that do not include the first terminal of the meeting with the second network.

6. The synchronization method of claim 5,
    wherein the first interval further comprises a discovery slot and a peering slot,
    wherein notifying the remaining terminals comprises sending a message providing notification of the meeting of the second network in the discovery slot or peering slot of the first network.

7. The synchronization method of claim 5, wherein notifying the remaining terminals comprises including information providing notification of the meeting of the second network in a synchronization signal transmitted by the first terminal and sending the synchronization signal.

8. The synchronization method of claim 1, further comprising: determining whether or not to move to the second network; and being synchronized with the second network if the first terminal determines to move to the second network.

9. The synchronization method of claim 8, further comprising notifying terminals belonging to the first network of the move if the first terminal moves to the second network.

10. The synchronization method of claim 9,
    wherein the first interval further comprises a discovery slot and a peering slot,
    wherein notifying the terminals of the move comprises sending information providing notification of the move to the terminals belonging to the first network in a message form in the discovery slot or peering slot of the first network.

11. The synchronization method of claim 8, further comprising notifying the terminals belonging to the second network of the move if the first terminal moves to the second network.

12. The synchronization method of claim 11, wherein the first interval further comprises a discovery slot and a peering slot wherein notifying the terminals of the move comprises sending information providing notification of the move to the terminals belonging to the second network in a message form in the discovery slot or peering slot of the second network.

13. The synchronization method of claim 8,
wherein the first interval further comprises a discovery slot and a peering slot,
the method further comprises not sending data while operating in reception mode during a second interval corresponding to the synchronization slot, discovery slot, and peering slot of the first network, if the first terminal has completed the synchronization and moved to the second network.

14. The synchronization method of claim 13, further comprising sending the data in intervals other than the second interval in the data slot of the second network.

15. The synchronization method of claim 8, wherein determining whether or not to move to the second network comprises determining whether or not to move to the second network based on a second interval indicative of a time difference between the synchronization slot of the first network and the synchronization slot of the second network, and a third interval obtained by subtracting the second interval from the first interval.

16. The synchronization method of claim 15, wherein determining whether or not to move to the second network comprises determining to move to the second network if the third interval is smaller than the second interval.

17. The synchronization method of claim 8, wherein:
being synchronized with the second network comprises being synchronized with the second network after a time-out if the first terminal determines to move to the second network; and
the time-out is determined based on a size of a contention window of the first terminal.

18. A terminal belonging to a first network of a plurality of networks included in a distributed wireless communication system, the terminal comprising:
an RF module configured to receive a synchronization signal from a second network of the plurality of networks; and
a processor configured to determine whether the synchronization signal is received in a data slot that is an interval that belongs to time resources of the first network and in which data is transmitted or received and to detect that the terminal has met the second network that is out of synchronization with the first network if the synchronization signal is determined to be received in the data slot.

19. The terminal of claim 18, wherein the processor operates in a reception mode without sending data in a synchronization slot, discovery slot, and peering slot of the first network if the synchronization signal is determined to be received in the data slot.

20. The terminal of claim 18, wherein:
the processor controls the terminal so that the terminal moves to the second network after a time-out if the synchronization signal is determined to be received in the data slot; and
the specific interval is determined based on a size of a contention window of the terminal.

* * * * *